United States Patent [19]

Belie

[11] Patent Number: 5,431,359
[45] Date of Patent: Jul. 11, 1995

[54] DOCKING SYSTEM FOR A LIGHTER-THAN-AIR VEHICLE

[75] Inventor: Robert G. Belie, Moorpark, Calif.

[73] Assignee: Lockheed Corporation, Calabasas, Calif.

[21] Appl. No.: 223,402

[22] Filed: Apr. 4, 1994

[51] Int. Cl.⁶ .............................................. B64B 1/66
[52] U.S. Cl. .................................. 244/116; 244/137.1
[58] Field of Search ............ 244/115, 116, 114, 137.1, 244/137.2

[56] References Cited

U.S. PATENT DOCUMENTS

| | | |
|---|---|---|
| 1,119,646 | 12/1914 | Schleinitz . |
| 1,748,500 | 2/1930 | Thaden . |
| 1,770,675 | 7/1930 | Short .................................. 244/116 |
| 1,853,777 | 4/1932 | Powelson . |
| 1,867,591 | 7/1932 | Pranke . |
| 3,595,407 | 7/1971 | Muller-Kuhn ................... 244/137.1 |
| 5,026,003 | 6/1991 | Smith .............................. 244/137.1 |
| 5,143,323 | 9/1992 | Husain .............................. 244/116 |

FOREIGN PATENT DOCUMENTS 3007130  9/1981  Germany ........................... 244/137.1

*Primary Examiner*—Galen L. Barefoot
*Attorney, Agent, or Firm*—Louis L. Dachs

[57] ABSTRACT

The invention is a combination docking and cargo handling system for a lighter-than-air vehicle. In detail, the invention includes a cargo carrying structure mounted to the bottom of the vehicle extending along at least a portion of the longitudinal axis having a plurality of open ended passageways aligned with the lateral axis of the vehicle and extending completely through the structure. The passageways are adapted to simultaneously off-load cargo containers from one end of the passageway and to on-load cargo containers from the opposite end. A platform, is included, having a longitudinal axis, and is rotatable about an axis of rotation. The platform includes: a center section for receiving the vehicle when docked; a first side portion extending along the longitudinal axis of the platform for receiving cargo containers off-loaded from the vehicle; a second side portion extending along the longitudinal axis of the platform for storing cargo containers to be simultaneously on-loaded; a first system to rotate the platform about the axis of rotation; and a second system to secure the vehicle to the platform. A transportation system is provided for receiving cargo containers from the first side portion of the platform and for positioning cargo containers for transfer onto the second side portion of the platform and transporting the cargo containers to and from remote locations.

29 Claims, 9 Drawing Sheets

DOCKING SYSTEM FOR A LIGHTER-THAN-AIR VEHICLE

BACKGROUND OF THE INVENTION

1. Field of the Invention

The invention relates to the field of airfield facilities and, in particular, to an airfield facility for docking and cargo handling system for lighter-than-air vehicles.

2. Description of Related Art

There are basically two types of lighter-than-air vehicles; rigid or non-rigid. There are three general types of non-rigid vehicles: those comprising a single gas filled bag; several gasbags joined together in series; and, of course, those having a multiple number gasbags within a non-rigid envelope. Rigid airships have an internal structure defining the shape of the vehicle and contain a plurality of gasbags therein and with an outer aerodynamic cover there over. In non-rigid designs the cargo flight station and cargo compartments are suspended from the bottom of the vehicle in what is most often referred to as a gondola. In rigid designs it is also common practice to mount the flight station/passenger and cargo compartments under the gasbag, although many designs integrate them in to the rigid frame of the vehicle.

One of the problems with both rigid and non-rigid lighter-than-air vehicles is their limited ability to station keep and/or maneuver when docking, especially if there are any significant cross-winds. This is due primarily to their large cross-sectional area that causes the vehicle to "weather vane" and "wave" with the wind. They are particularly difficult to control if the wind is gusting or when there are significant up or down drafts. In fact, docking has proven to be the most difficult portion of a flight for a lighter-than-air vehicle. Thus the most common docking procedure is moor the vehicle by its nose and let it weather vane.

Additionally, unlike a conventional aircraft, the lift force developed by the gasbag remains when docked. Thus as cargo is unloaded, the net lift force increases. In the past, this increase in the net lift has been absorbed by docking restraints, for example mooring lines. If the cargo weight is very large, the force exerted on the mooring lines becomes large and "station keeping" when docked becomes even more difficult. Therefore, unloading and reloading of cargo sometimes must wait until any winds have sufficiently died down or additional mooring lines must be used to "lock" the vehicle in one position. It is obvious, however, that it is always important to minimize the time spent in such operations.

The docking aspects of the problem was addressed in U.S. Pat. No. 1,119,646 "Device For Landing Or Berthing Airships" by H. V. Schleinitz wherein a rotating platform for docking lighter-than-air vehicles is disclosed. In addition, U.S. Pat. No. 1,867,591 "Dirigible Air Dock" by A. S. Pranke discloses a rail mounted rotating platform. U.S. Pat. No. 1,748,500 "Mooring Of Airships by" H. V. Thaden discloses the use of circular tracks having devices for supporting the vehicle such that the vehicle can align with the prevailing wind. U.S. Pat. No. 1,853,777 "Method Of And Apparatus For Berthing Airships" by W. V. N. Powelson, et al. discloses a rotatable suspension system for docking a lighter-than-air vehicle wherein the suspension system is rotated so that it is aligned with the relative wind. After the vehicle is secured the suspension system is rotated such that the vehicle is aligned with a below ground level pit that is used to shelter the vehicle. While all these concepts allow the vehicle to dock and to weather vane after docking; none of the above concepts provide for simultaneous loading and unloading of cargo, while the vehicle weather vanes.

The conventional loading of cargo containers and the like through doors located on the side of the vehicle is too slow and it would be difficult to simultaneously load and unload cargo in order to maintain the gross weight of the vehicle constant. Cargo aircraft, such as the C-5 military transport, have front and rear opening doors to the cargo compartment. However, moving the cargo simultaneously in the front and out the rear of a large lighter-than-air vehicle would still be a difficult and a time consuming operation, especially if the cargo compartment is some 600 to 800 feet long. In addition, requiring an uninterrupted passageway over such a length would greatly complicate the design of the gondola. The use of individual cargo compartments located along either side of the vehicle can reduce the cargo loading and unloading time, but does not address the need to maintain a constant payload weight on the vehicle.

The need to maintain a constant payload weight during loading and unloading of cargo and to provide a cargo loading system that minimizes the docking time for unloading and loading cargo was addressed by the invention disclosed in co-pending patent application Ser. No. 08/148,224, entitled "A Cargo Loading System For A Lighter-Than-Air Vehicle" by G. Belie, et al., filed Nov. 8, 1993. This invention is a cargo compartment for a lighter-than-air vehicle. In detail, the cargo compartment includes a cargo carrying structure mounted to the bottom of the vehicle having a plurality of passageways extending along the longitudinal axis of the vehicle. Each of the passageways is aligned with the lateral axis of the vehicle and extends completely through the structure and is adapted to provide simultaneous unloading of cargo from one end and loading of cargo from the opposite end. A cargo moving system is mounted in the floor of each passageway for moving the cargo in one end and out the opposite end of the passageway and to intermediate positions therebetween. A cargo securing system is mounted on the floor of the passageway for releasable securing the cargo within the passageway at the intermediate positions. Thus not only is a significant amount of time saved, but the weight of the vehicle remains essentially constant.

However, the problem of bringing the cargo to and from the vehicle when the vehicle weather vanes must be simultaneously addressed in order to insure that the time advantage of the above described cargo system is not lost. Besides the cargo issue, there is the problem of refueling of the vehicle, as well as conducting the necessary maintenance of the vehicle when it weather vanes.

U.S. Pat. No. 5,143,323 "Airship Handling System" by F. Husain discloses a rotating platform for docking a vehicle. The platform incorporates an arresting gear assembly. The cargo is contained in a module that is mounted in an open recess at the bottom of the vehicle. The module is removed at a first position on the platform and lowered down therein. The vehicle must be moved to a second position for the loading of a replacement module. This design has several drawbacks, among which are that the cargo can not be simultaneously loaded and unloaded, and the vehicle must be moved after unloading to a new position for reloading.

These drawbacks greatly increase the turn-a-round time and complicate the design of the platform. Additionally the use of a cargo module in such a manner, requires that it be designed and certified as part of the vehicle airframe, greatly increasing its cost.

Thus it is a primary object of the subject invention to provide a docking system for a lighter-than-air vehicle.

It is another primary object of the subject invention to provide a docking system for a lighter-than-air vehicle that can accommodate the vehicle when it weather vanes during docking and after docking during cargo loading, refueling, maintenance and storage.

It is a further another object of the subject invention to provide a docking system for a lighter-than-air vehicle that is compatible with conventional cargo transporting systems.

SUMMARY OF THE INVENTION

In general terms, the invention is a combination docking and cargo handling system for a lighter-than-air vehicle having a longitudinal, vertical and lateral axis. In detail, the invention includes a cargo carrying structure mounted to the bottom of the vehicle. The structure extends along at least a portion of the longitudinal axis having a plurality of open ended passageways aligned with the lateral axis of the vehicle and extending completely through the structure. The passageways are adapted to simultaneously off-load cargo containers from one end of the passageway and to on-load cargo containers from the opposite end. A platform, is included, having a longitudinal axis, and is rotatable about an axis of rotation. The platform includes: a center section for receiving the vehicle when docked; a first side portion extending along the longitudinal axis of the platform for receiving cargo containers off-loaded from the vehicle; a second side portion extending along the longitudinal axis of the platform for storing cargo containers to be simultaneously on-loaded; a first system to rotate the platform about the axis of rotation; and a second system to secure the vehicle to the platform. A transportation system is provided for receiving cargo containers from the first side of the platform and for positioning cargo containers for transfer onto the second side of the platform and transporting the cargo containers to and from remote locations.

In a first embodiment of the invention, the axis of rotation of the platform is generally at its center and the second system secures the vehicle to the platform such that the center of the vehicle is co-incident with the axis of rotation. Preferably, the first system includes a plurality of circular tracks having a center co-incident with the axis of rotation of the platform. A plurality of wheels are mounted on the platform in contact with the plurality of circular tracks. A propulsion system mounted on the platform is coupled to and drives one or more of the wheels providing for rotation of the platform. An alternate approach is to pin the platform at its center (axis of rotation) and mount a plurality of conventional wheels on the platform positioned to allow rotation of the platform about the axis of rotation. This latter approach requires that the ground be suitably prepared to take the loads induced by the platform and any vehicle docked thereon. It does, however, easily compensates for expansion and contraction of the platform due to temperature changes.

One version of the second system for securing the vehicle to the platform includes a mooring tower mounted on one end of the platform. A collar is mounted on the tower that is movable vertically upward and downward thereon and includes one half of a quick disconnect type coupling. A winch incorporating a retractable line is mounted in the nose of the vehicle. The second half of the quick disconnect coupling is connected to the end of the line, such that when the quick disconnect halves are joined together, the vehicle can be winched into contact with the tower even with a head wind. The securing system also includes a plurality of winches mounted along the vehicle on either side thereof having mooring lines that can extended downward and tied down to a plurality of tie down fixtures mounted along the platform.

In a second version of the second system for securing the vehicle to the platform, the mooring tower includes a bottom portion fixed to the end of the platform. The top portion is movably mounted to the bottom portion such that it can "telescope" upward and downward. A first winch is located at the top of the tower having a retractable line with half of a quick disconnect coupling attached to the end. A second winch is mounted in the nose of the vehicle that incorporates a retractable line having the second half of the quick disconnect coupling attached thereto. When a vehicle approaches, the top portion of the tower is extended upward. The lines from the two winches are extended down to the platform so that the ground crew can connect the disconnect halves together. The vehicle is winched into contact with the tower. Thereafter, the upper portion of the tower is lowered as the vehicle mounted winches along each side are used to "pull" the vehicle downward to and to secure it to the platform.

The transportation system includes a pair of parallel tracks equally spaced from the axis of rotation and spaced apart a distance slightly greater than the width of the platform. The tracks extend from a point beyond the platform to a point along at least a portion of the length thereof, at least the length of the cargo compartment of the docked vehicle. Thus loaded rail mounted cars from warehouses located nearby can be brought along one side of the platform for off-loading cargo thereon and cargo on the platform can be off-loaded onto unloaded cars. Of course, parallel roads and conventional trucks can be used to bring to and remove cargo from the platform.

In a second embodiment of the invention, the platform is rotatable about an axis of rotation at one end and the second system secures the vehicle to the platform such that the nose of the vehicle is generally co-incident with the axis of rotation of the platform. In this embodiment, the first system to rotate the platform about its axis of rotation includes a plurality of circular tracks with centers co-incident therewith. Again, if the ground is suitably prepared, conventional wheels and circular roads can be used. For this second embodiment, the second system for securing the vehicle to the platform requires that the tower by mounted at the one end, co-incident with the axis of rotation. Thus when the mooring lines are secured the vehicle will rotate about the one end (the tower). All other systems remain identical with the first embodiment.

In operation, prior to the vehicle docking, the platform is aligned with the parallel tracks and loaded and unloaded cars are brought along the sides of the platform from remote locations such as warehouses. The cargo is loaded on the first side portion of the vehicle and previously unloaded cargo from a departed vehicle stored on the first side portion of the platform is off-loaded therefrom onto the empty cars. After the cars are returned to the warehouses, the platform, with the restaged cargo thereon, is rotated so that it is aligned with the then prevailing wind. The vehicle approaches from a downwind direction and as it starts to extend over the platform it is stopped and begins to hover. The vehicle is secured to the platform either the movable collar or telescoping tower concepts. Thereafter, the cargo can be unloaded and new cargo simultaneously loaded onto the vehicle. Note that should the wind shift, the vehicle will tend to weather vane and realign with the wind and the platform is rotated to bring the vehicle into such alignment. This reduces any wind induced loads on the vehicle to a minimum. The advantage of the first embodiment, wherein the platform rotates about its center is that only one fourth of the land area is required to accommodate a full 360 degree swing of the platform. However, with the second embodiment, the tendency to self align is increased.

During this repositioning, the cargo loading and unloading operations can continue. After the cargo has been loaded and any required vehicle replenishing and repair has been accomplished, the vehicle is un-moored and disconnected from the tower and leaves the platform. The platform can then be rotated into realignment with the parallel tracks or roads wherein the cars or trucks can again be brought along side. Thus this system eliminates, or, at least dramatically reduces, the problems associated with prior art docking and cargo handling methods and systems, in that, cargo loading and unloading can continue as the vehicle weather vanes and the gross weight of the vehicle is essentially maintained at a constant value. In addition, the docking system reduces the turn around time for such vehicles to a minimum due to the high degree of parallelism in the system. This also provides a high degree of repeatability for reliable and predictable operations.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
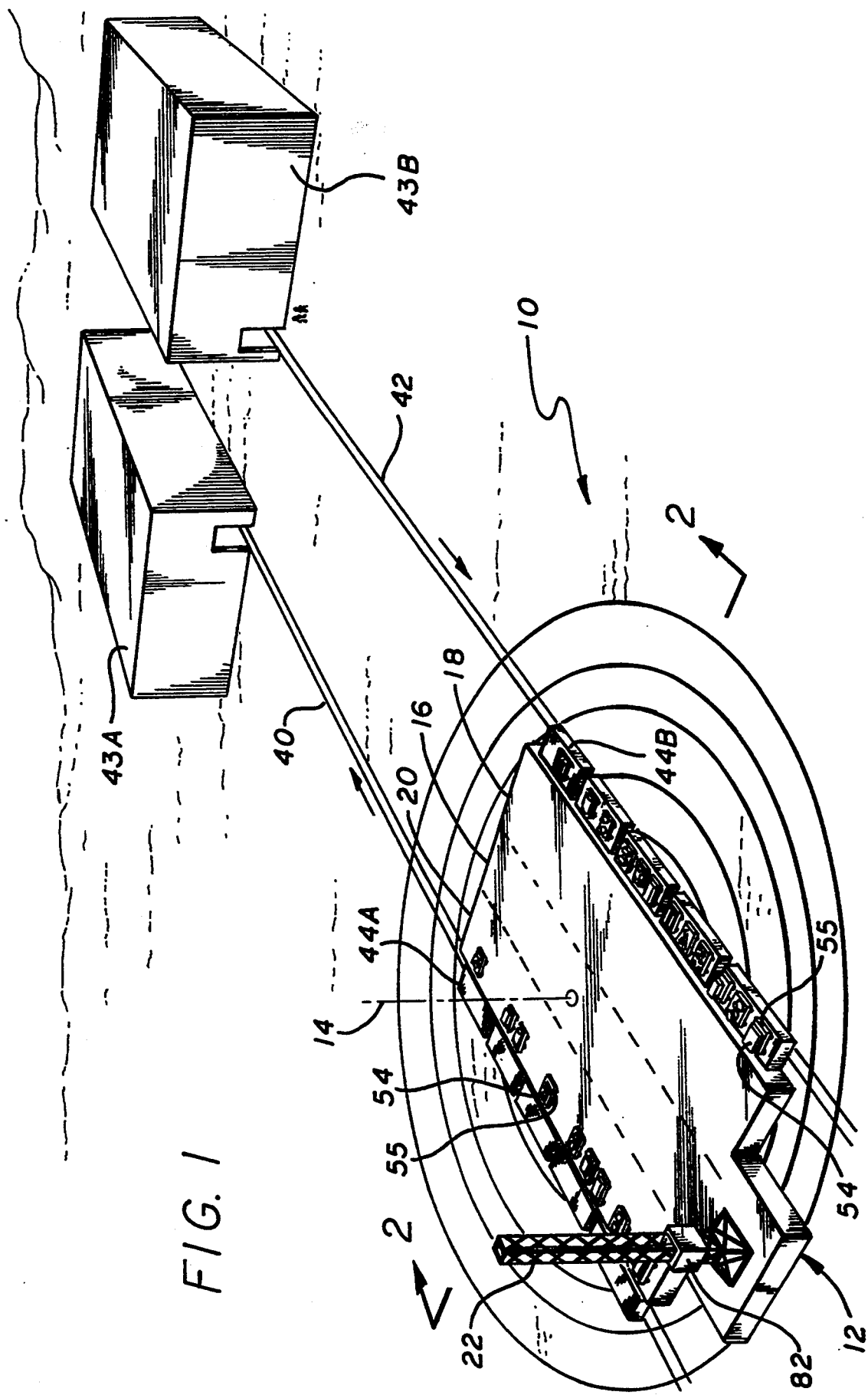
FIG. 1 is a perspective view of a first embodiment of the docking system wherein the platform is rotatable about its center.
Figure 2:
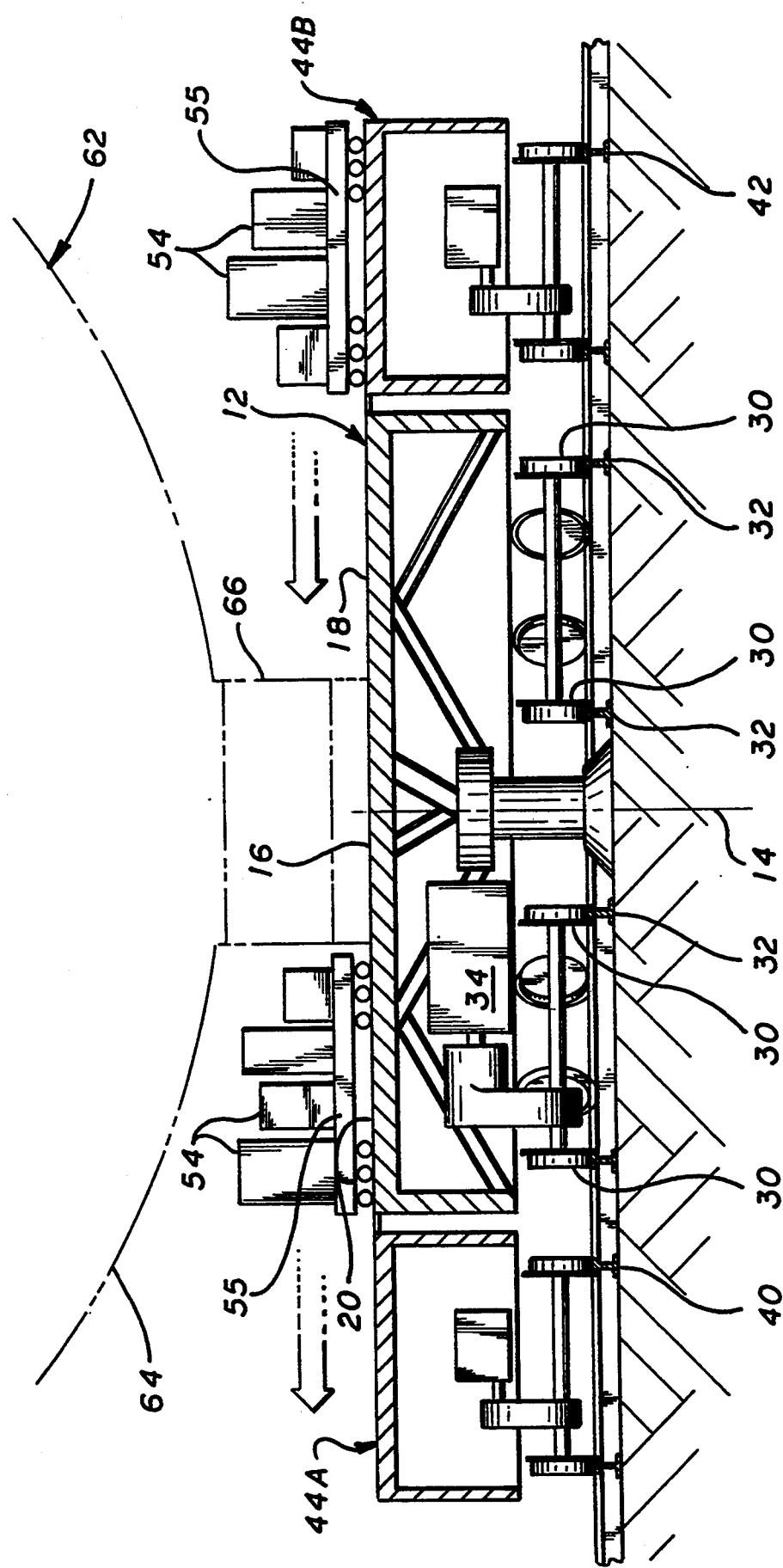
FIG. 2 is a cross-sectional view of the docking system illustrated in FIG. 1 taken along the line 2—2.

Referring to FIGS. 1 and 2, the docking system, generally indicated by numeral 10, includes a platform 12, rotatable generally about its center 14 (axis of rotation). The platform 12 includes: a center portion 16 for receiving a lighter-than-air vehicle; a first side portion 18 for storing cargo for loading onto the vehicle; a second side portion 20 for receiving cargo unloaded from the vehicle; and a mooring tower 22 mounted on one end. The platform 12 further includes a plurality of wheels 30 in engagement with a plurality of circularly configured rails 32 having their center co-incident with the axis of rotation 14 of the platform. A powerplant 34 is mounted on the platform and is coupled to one or more sets of wheels 30 for driving the platform about its center (axis of rotation). The powerplant 34 can take many forms, for example a diesel electric locomotive powerplant. Of course, a multiple number may be necessary, particularly if the platform 12 is large.

A pair of parallel tracks 40 and 42, that originate from remotely located warehouses 43A and 43B, are equally spaced from the axis of rotation 14 and spaced from each other a distance sufficient to allow rail cars 44A and 44B to come along either side of the platform when it is aligned therewith. Of course, a pair of parallel roads could be used in conjunction with trucks (not shown) instead of the rail system shown in FIG. 1. Regardless, as illustrated in FIG. 2, these rail cars 44A and 44B are used to off-load cargo, such as cargo containers 54 carried on carts 55, from the side portion 20 and to load cargo containers also carried on carts 55 on to side portion 18. The use of the movable carts 55, as will be subsequently seen, aid in the transfer of cargo to and from a docked vehicle.

Figure 3:
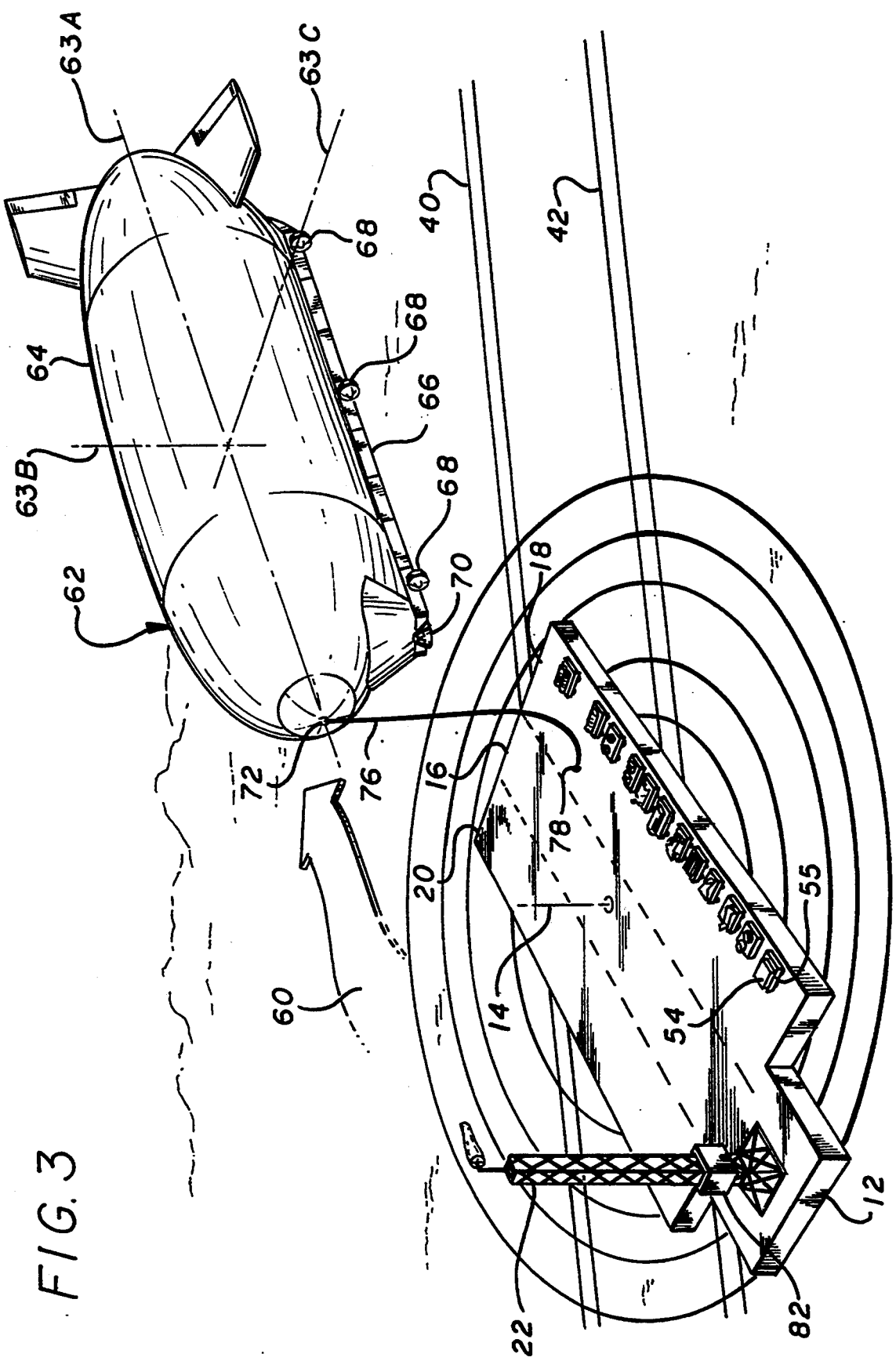
FIG. 3 perspective view of the system similar to FIG. 1 illustrating the platform incorporating a first version of a first version of the vehicle securing system aligned with the prevailing wind ready to receive an approaching lighter-than-air vehicle approaching to dock.
Figure 4:
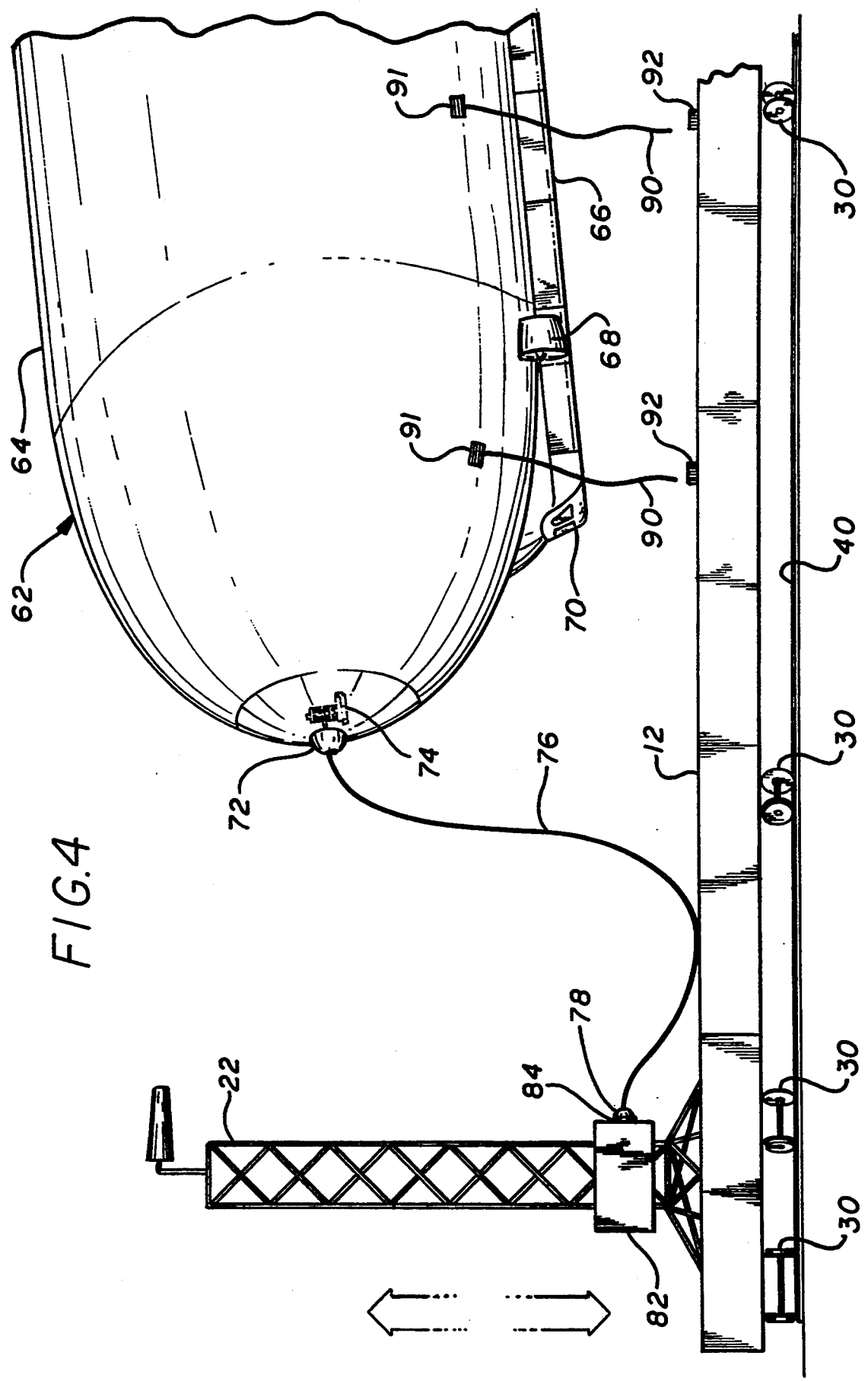
FIG. 4 is a partial view of the vehicle and mooring tower illustrating the first version of the securing system used to bring the vehicle in the docked position.

Still referring to FIGS. 1 and 2 and additionally to FIGS. 3 and 4, after the carts 55, carrying cargo containers 54, have been loaded onto the side 18 of the platform 12 and the rail cars 44A and 44B are returned to the warehouses 43A and 43B, respectively, the platform 12 is rotated such that it is aligned with the prevailing wind, indicated by arrow 60. A lighter-than-air vehicle 62 is illustrated in FIG. 3 approaching downwind to the aligned platform 12. The vehicle 62, having a longitudinal axis 63A, vertical axis 63B and lateral axis 63C, also includes a gasbag 64 to which is suspended a gondola 66. A plurality of propulsion systems 68 are mounted on the gondola and the flight station 70 is located in the front under the nose 72. As particularly shown in FIG. 4 the vehicle 62 includes a winch 74 mounted in the nose 72 containing a flexible line 76 terminating in a first half of a coupling 78. A collar 82 is rotatably mounted on the tower 22 and is also movable vertically thereon. A second half of the coupling 84 is mounted on the collar 82. As the vehicle 62 approaches the platform 12, the line 76 is un-reeled, and coupling half 78 is attached by ground crew members (not shown) to coupling half 84.

The collar 82 is initially in its lower position wherein the coupling halves are joined and, thereafter, the collar is raised to a docking position, indicated by 82A. On approach, the vehicle 62 can also extend a plurality of mooring lines 90 from winch assemblies 91 mounted on the vehicle 62. The winch assemblies 74 and 91 are used to pull the vehicle to the mooring tower 22, in conjunction with thrust from the propulsion systems 68. The mooring lines 90 from the winch assemblies 91 are secured to fittings 92 on the platform 12. The collar 82 is lowered as the winch assemblies 91 reel in the lines 90 until contact with the center portion 16 of the platform 12 is made. Because the vehicle is designed to be "powered down" on to the platform 12, other securing systems, such as clamps (not shown) mounted on the platform, could be used to secure the vehicle 62 thereto.

Figure 5:
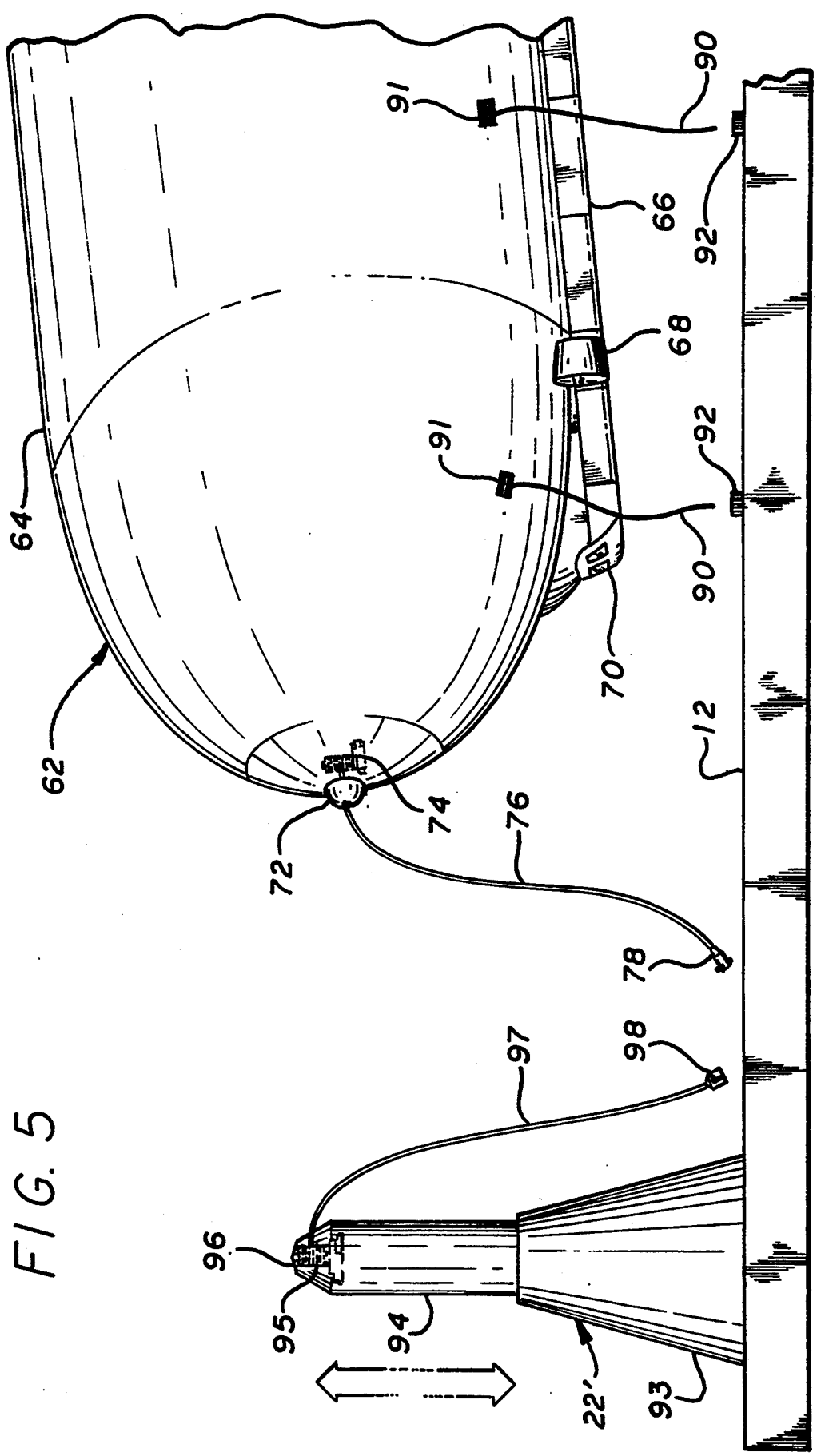
FIG. 5 is a view similar to FIG. 4 illustrating a second version of the vehicle securing system used to bring the vehicle in the docket position.
Figure 6:
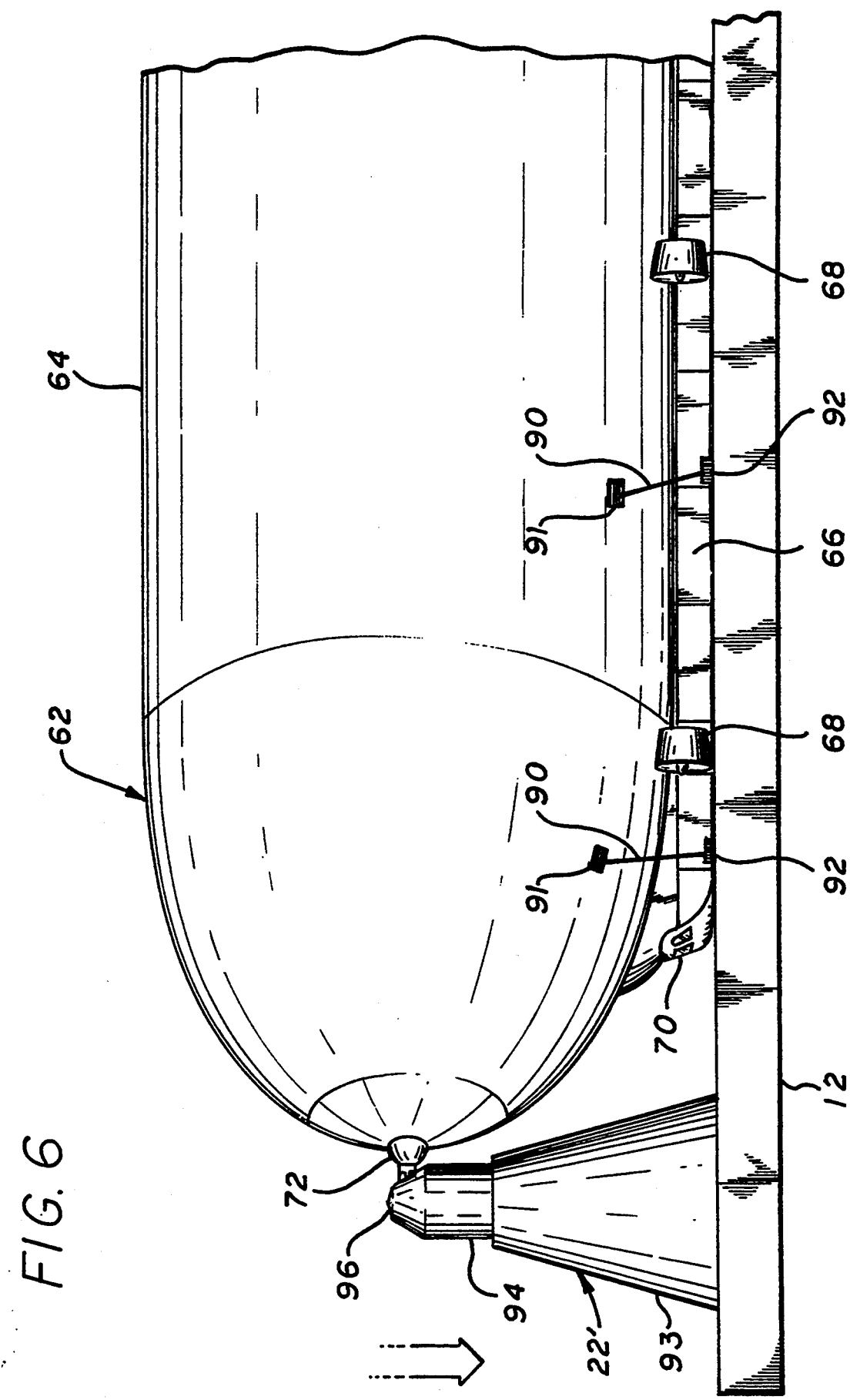
FIG. 6 is a view similar to FIG. 5 illustrating the vehicle docked using the second version of the vehicle securing system.

In FIGS. 5 and 6 a second vehicle securing system is illustrated wherein the tower, designated by numeral 22', that comprises a lower, fixed portion 93 and a vertically telescoping upper portion 94. A winch 95 is mounted in the top 96 having a mooring line 97 terminating in a disconnect half 98. As the vehicle 62 approaches the platform 12, the upper portion 94 of the tower 22' is raised and the mooring line 97 is extended. The coupling half 98 is connected to the coupling 78 and the vehicle is pulled to the tower 22', in conjunction with thrust from the propulsion systems 68. When contact is made, the upper portion 94 is lowered as the winch assemblies 91 reel in the lines 90 until contact with the center portion 16 of the platform 12 is made.

Figure 7:
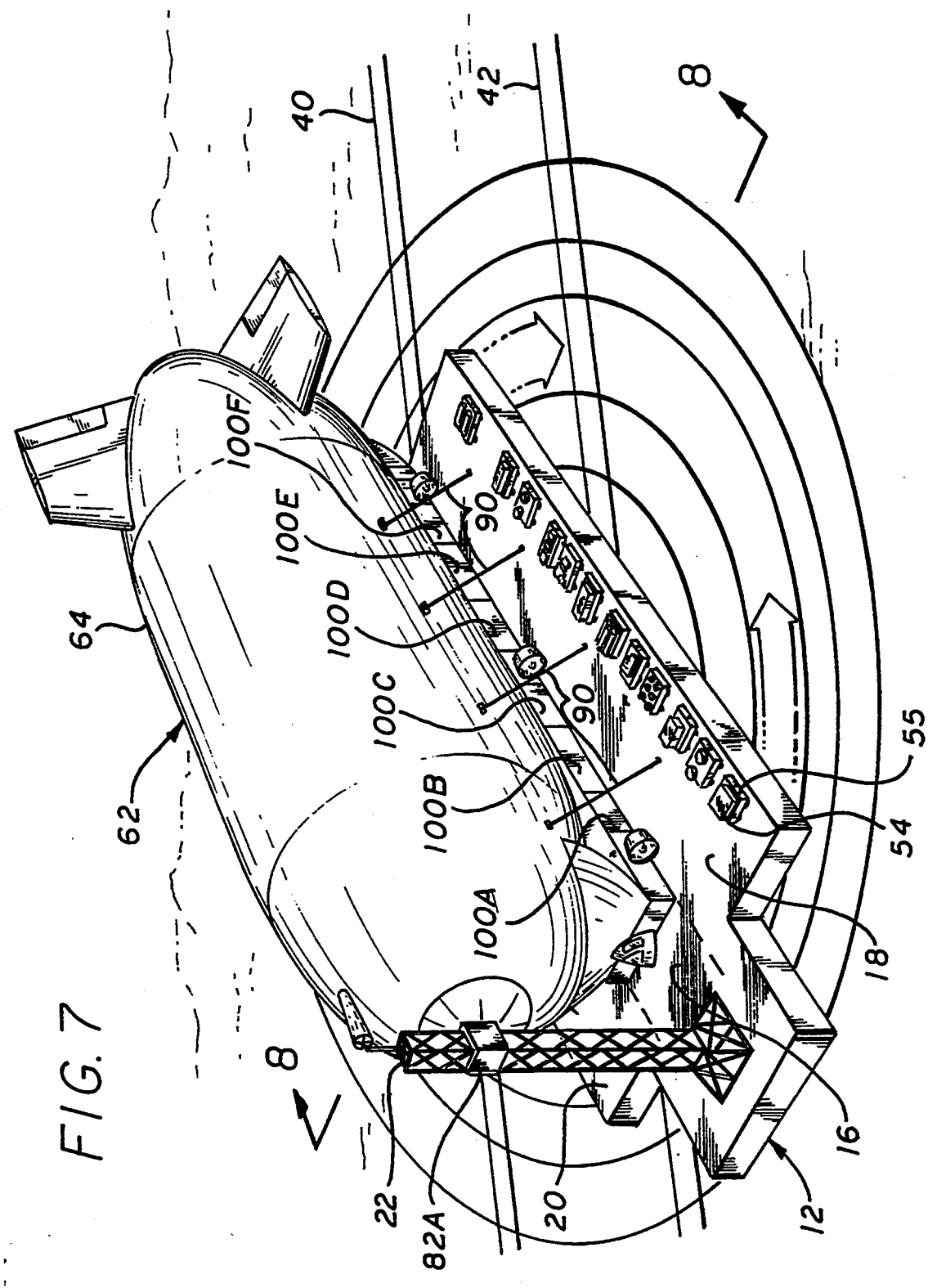
FIG. 7 is perspective view of the docking system with a lighter-than-air vehicle moored thereto.
Figure 8:
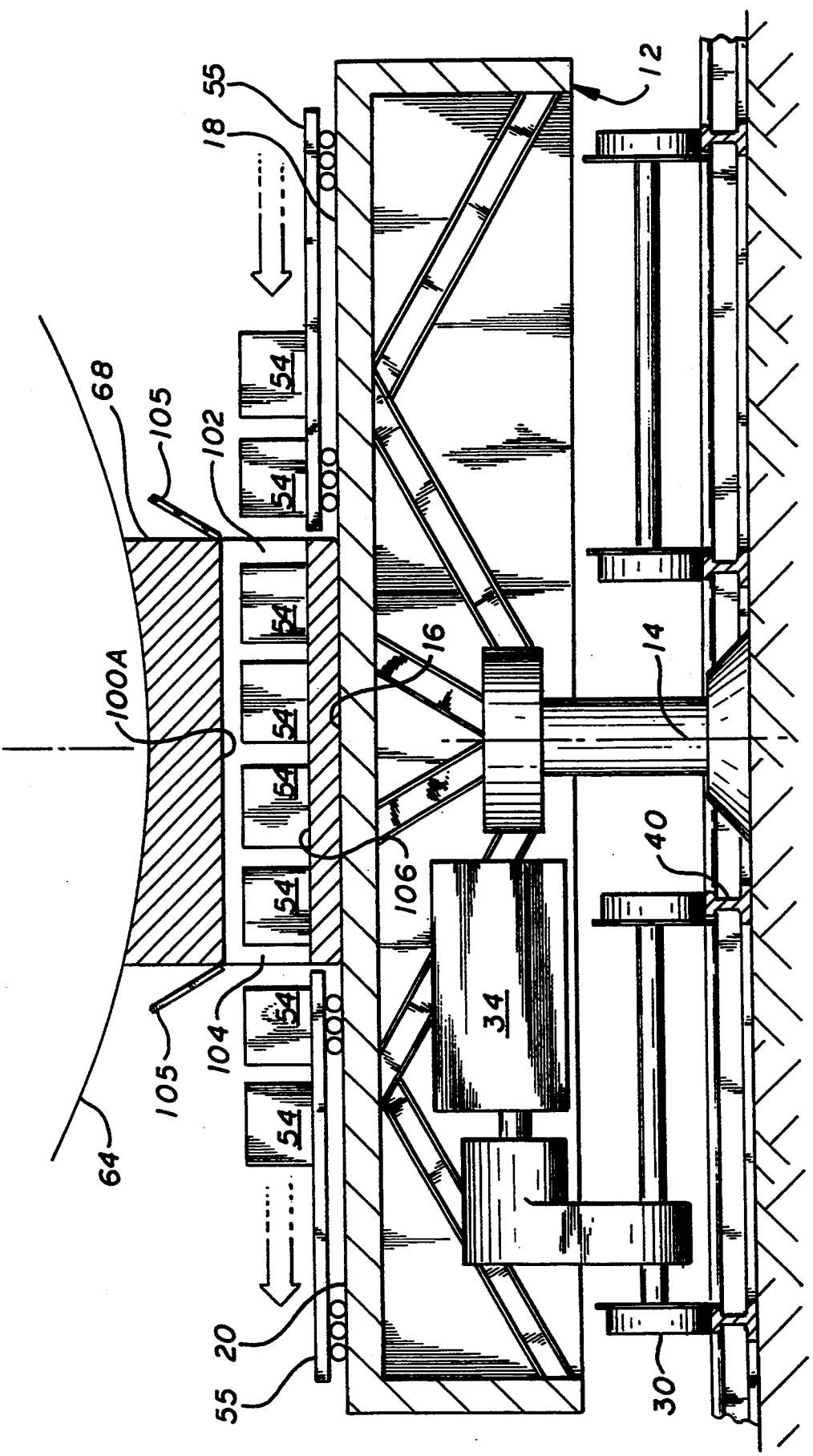
FIG. 8 is a cross-sectional view similar to FIG. 2 illustrating a lighter-than-air vehicle moored to the platform and being simultaneously unloaded and reloaded with cargo.

Referring particularly to FIGS. 7 and 8, it can be seen that the gondola 66 includes a plurality of passageways 100A-F extending along the longitudinal axis 63A. The passageways 100A-F are aligned with the lateral axis 63C and extend completely through the gondola 66 with first and second ends, indicated by numerals 102 and 104, respectively. Each end includes fold up doors 105 attached thereto for protecting the cargo while in flight. The passageways 100A-F are configured to receive and hold one or more of the cargo containers 54. Because all the passageways 100A-F are basically identical the following remarks shall be directed at just one, 100A. The floor 106 of the passageway 100A contains a plurality of roller assemblies (not shown) that allow the cargo containers 54 to be "rolled" on to the floor 106 and, in fact, in end 102 when loading and out end 104 when unloading. Although the cargo containers 54 can be pushed by hand, a plurality of powered roller assemblies (not shown) are provided in the floor 106 to assist in the movement of the cargo containers 54 in and out of the passageway. A cargo container locking system (not shown) is provided to prevent movement along the longitudinal axis, vertical axis and lateral axis, 63A, 63B, and 63C, respectively. It should be noted that the use of the carts 55 to carry the cargo containers 54 is optional; however, there use, particularly, if they have a "rollarized bed," allows the cargo containers to be more easily aligned with the passageways 100A-F.

Cargo containers 54 are simultaneously removed from the passageways 100A-F out ends 104. Thus a constant payload weight is always applied to the gasbag 64. Of course, the individual weight of the loaded cargo containers 54 must be known so that they can be matched with the containers being unloaded. In addition, the normal center of gravity shifts must be considered, as in the case of a conventional aircraft. If the total weight of the new cargo is dramatically different from that being off loaded, then containers loaded with ballast (not shown) may have to be used. Such a case would occur if the cargo being unloaded were automobiles and cut flowers were being loaded. The vehicle cargo loading system is discussed in more detail in co-pending patent application Ser. No. 08/148,224, entitled "A Cargo Loading System For A Lighter-Than-Air Vehicle" by G. Belie, et al., filed Nov. 8, 1993, herein incorporated by reference.

After the vehicle 62 has been serviced and the new cargo has been loaded, the powerplants 68 are started and the vehicle is released from the tower 22 and from the platform 12. After the vehicle 62 has taken off, the platform 12 is repositioned in alignment with the parallel rails 40 and 42 wherein new cargo containers are brought from the warehouse 43A and the off-loaded cargo container are brought to warehouse 43B.

Figure 9:
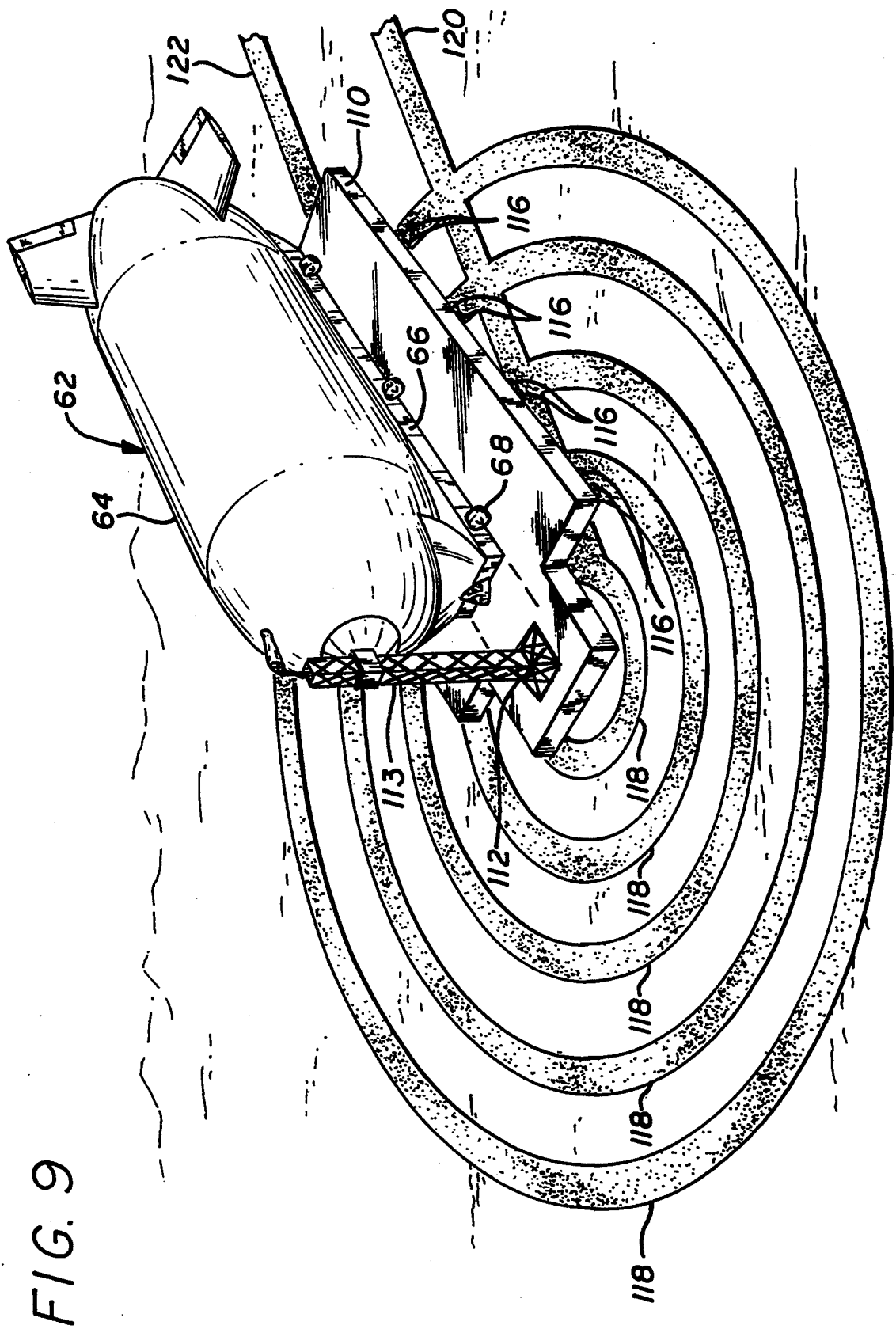
FIG. 9 is a perspective view of a second embodiment of the docking system wherein the platform is rotatable about one end.

A second embodiment is illustrated in FIG. 9 wherein a platform 110 is rotatably mounted at one end 112 (axis of rotation) instead of its center. A mooring tower 113 is mounted on the platform 110 that is co-incident with the axis of rotation 112. The platform 110 is mounted on a plurality of wheels 116 (instead of rails) that ride on circular roads 118 having their center co-incident with the axis of rotation of the platform. The wheels 112 would be driven by a propulsion system (not shown) as in the previously discussed rail mounted system. Additionally, parallel roads 120 and 122 are used to bring cargo to and from the platform. The previously described rail mounted could also be used with this platform. All other portions of the system remain identical. The advantage of this second embodiment is that the tendency of vehicle to align itself with any wind is increased. However, it takes four times the land area.

While the invention has been described with reference to a particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the airline, aircraft and construction industry involved in the building of airports and the like.

I claim:

1. A docking and cargo handling system for a lighter-than-air vehicle having a longitudinal, vertical and lateral axis comprising:
  a cargo carrying structure mounted to the bottom of the vehicle extending along at least a portion of the longitudinal axis having a plurality of open ended passageways aligned with the lateral axis of the vehicle and extending completely through said structure, said passageways adapted to simultaneously off-load cargo containers from one end of said passageway and to on-load cargo containers from the opposite end;
  a platform, having a longitudinal axis, said platform rotatable about an axis of rotation, said platform comprising:
    a center section for receiving the vehicle when docked;

a first side portion extending along the longitudinal axis of said platform for receiving cargo containers off-loaded from the vehicle;

a second side portion extending along the longitudinal axis of said platform for storing cargo containers to be simultaneously loaded on the vehicle;

first means to rotate said platform about said axis of rotation; and second means to secure the vehicle to said platform; and transportation means for receiving cargo containers from said first portion of said platform and for positioning cargo containers for transfer onto said second side of said platform, and transporting said cargo containers to and from remote locations.

2. The system as set forth in claim 1 comprising:
said axis of rotation of said platform is generally at its center; and
said second means is adapted to secure the vehicle to said platform such that the center of the vehicle is co-incident with said axis of rotation of said platform.

3. The system as set forth in claim 2 wherein said first means to rotate said platform about its axis of rotation comprises:
a plurality of circular tracks having a center co-incident with said axis of rotation of said platform; and
a plurality of wheels mounted on said platform in contact with said plurality of circular tracks.

4. The system as set forth in claim 3 wherein said first means to rotate said platform about said axis of rotation further comprises propulsion means thereon for rotating said platform on said plurality of tracks about said axis of rotation.

5. The system as set forth in claim 4 wherein said first means to rotate said platform about its axis of rotation comprises:
said platform fixed to said axis of rotation; and
a plurality of wheels mounted on said platform positioned to allow rotation of said platform about said axis of rotation.

6. The system as set forth claim 5 wherein said first means to rotate said platform about its axis of rotation further comprises propulsion means mounted thereon for rotating said platform about said axis of rotation.

7. The system as set forth in claim 1, or 2, or 3, or 4, or 5, or 6, wherein said second means comprises:
a mooring tower mounted on one end of said platform;
means for securing the nose of the vehicle to said tower; and
means for securing the vehicle to said platform at a plurality of locations along the length of the vehicle.

8. The system as set forth in claim 7 wherein said mooring tower is positioned on said platform such that when the vehicle is secured to both said mooring tower and said platform, the center of the vehicle is co-incident with said axis of rotation of said platform.

9. The system as set forth in claim 8 wherein said means for securing the nose of the vehicle to said tower comprises:
a collar movably mounted on said tower, said collar movable vertically up and down said tower; and
the vehicle including means to attach the nose of the vehicle to said collar.

10. The docking system as set forth in claim 9 wherein:
said collar includes one half of a quick disconnect fastener; and
said means to attach the nose of vehicle to said collar is a winch having the second half of said quick disconnect fastener mounted on the end of an extendable and retractable flexible line;
such that when said quick disconnect halves are joined together, the vehicle can be winched into contact with said tower.

11. The system as set forth in claim 8 wherein said means for securing the nose of the vehicle to said tower comprises:
said tower having upper and lower portions, said upper portion movably mounted to said lower portion such that said upper portion telescopes upward and downward into and out of said lower portion; and
the vehicle including means to attach the nose of the vehicle to the top of the upper portion of said tower.

12. The docking system as set forth in claim 11 wherein said means to attach the nose of the vehicle to said tower comprises:
a first winch located in the top of said upper portion of said tower, said first winch having a first half of a quick disconnect fastener mounted on the end of an extendable and retractable flexible line; and
a second winch mounted in the nose of the vehicle, said second winch having the second half of said quick disconnect fastener mounted on the end of an extendable and retractable flexible line;
such that when said flexible lines of said first and second winches are extended, said quick disconnect halves can joined together and the vehicle can be winched into contact with said tower by retracting the lines of said winches.

13. The system as set forth in claim 12 wherein said means for securing the vehicle to said platform at a plurality of locations along the length of the vehicle comprises:
the vehicle including a plurality of winches having mooring lines; and
said platform including a plurality of tie down fixtures for receiving said mooring lines.

14. The docking system as set forth in claim 11 wherein said transportation means comprises a pair of parallel tracks equally spaced from said axis of rotation and spaced a part a distance slightly greater than the width of said platform, said tracks extending from a point beyond said platform to a point along at least portion of the length thereof;
such that loaded rail mounted cargo containers can be brought along the sides of said platform for off loading thereon from said first portion and loading cargo containers on said second portion of said platform.

15. The docking system as set forth in claim 13 wherein said transportation means comprises a pair of parallel roads equally spaced from said axis of rotation and spaced a part a distance slightly greater than the width of said platform, said roads extending from a point beyond said platform to a point along at least portion of the length thereof;
such that loaded rail mounted cargo containers can be brought along the sides of said platform for off loading thereon from said first portion and loading cargo containers on said second portion of said platform.

16. The system as set forth in claim 1 comprising:
said axis of rotation of said platform is at one end thereof; and
said second means is adapted to secure the vehicle to said platform such that the nose of the vehicle is co-incident with said axis of rotation of said platform.

17. The system as set forth in claim 16 wherein said first means to rotate said platform about its axis of rotation comprises:
a plurality of circular tracks having a center co-incident with said axis of rotation of said platform; and
a plurality of wheels mounted on said platform in contact with said plurality of circular tracks.

18. The system as set forth in claim 17 wherein said first means to rotate said platform about said axis of rotation further comprises propulsion means thereon for rotating said platform on said plurality of tracks about said axis of rotation.

19. The system as set forth in claim 18 wherein said first means to rotate said platform about its axis of rotation comprises:
said platform fixed to said axis of rotation; and
a plurality of wheels mounted on said platform positioned to allow rotation of said platform about said axis of rotation.

20. The system as set forth claim 19 wherein said first means to rotate said platform about its axis of rotation further comprises propulsion means mounted thereon for rotating said platform about said axis of rotation.

21. The system as set forth in claim 16, or 17 or 18, or 19, or 20, wherein said second means comprises:
a mooring tower mounted on one end of said platform;
means for securing the nose of the vehicle to said tower; and
means for securing the vehicle to said platform at a plurality of locations along the length of the vehicle.

22. The system as set forth in claim 21 wherein said mooring tower is positioned on said platform such that when the vehicle is secured to both said mooring tower and said platform, the center of the vehicle is co-incident with said axis of rotation of said platform.

23. The system as set forth in claim 22 wherein said means for securing the nose of the vehicle to said tower comprises:
a collar movably mounted on said tower, said collar movable vertically up and down said tower; and
the vehicle including means to attach the nose of the vehicle to said collar.

24. The docking system as set forth in claim 23 wherein:
said collar includes one half of a quick disconnect fastener; and
said means to attach the nose of vehicle to said collar is a winch having the second half of said quick disconnect fastener mounted on the end of an extendable and retractable flexible line;
such that when said quick disconnect halves are joined together, the vehicle can be winched into contact with said tower.

25. The system as set forth in claim 24 wherein said means for securing the nose of the vehicle to said tower comprises:
said tower having upper and lower portions, said upper portion movably mounted to said lower portion such that said upper portion telescopes upward and downward into and out of said lower portion; and
the vehicle including means to attach the nose of the vehicle to the top of the upper portion of said tower.

26. The docking system as set forth in claim 25 wherein said means to attach the nose of vehicle to said tower comprises:
a first winch located in the top of said upper portion of said tower, said first winch having a first half of a quick disconnect fastener mounted on the end of an extendable and retractable flexible line; and
a second winch mounted in the nose of the vehicle, said second winch having the second half of said quick disconnect fastener mounted on the end of an extendable and retractable flexible line;
such that when said flexible lines of said first and second winches are extended, said quick disconnect halves can joined together and the vehicle can be winched into contact with said tower by retracting the lines of said winches.

27. The system as set forth in claim 26 wherein said means for securing the vehicle to said platform at a plurality of locations along the length of the vehicle comprises:
the vehicle including a plurality of winches having mooring lines; and
said platform including a plurality of tie down fixtures for receiving said mooring lines.

28. The docking system as set forth in claim 27 wherein said transportation means comprises a pair of parallel tracks equally spaced from said axis of rotation and spaced a part a distance slightly greater than the width of said platform, said tracks extending from a point beyond said platform to a point along at least portion of the length thereof;
such that loaded rail mounted cargo containers can be brought along the sides of said platform for off loading thereon from said first portion and loading cargo containers on said second portion of said platform.

29. The docking system as set forth in claim 28 wherein said transportation means comprises a pair of parallel roads equally spaced from said axis of rotation and spaced a part a distance slightly greater than the width of said platform, said roads extending from a point beyond said platform to a point along at least portion of the length thereof;
such that loaded rail mounted cargo containers can be brought along the sides of said platform for off loading thereon from said first portion and loading cargo containers on said second portion of said platform.

* * * * *